July 9, 1963 R. L. SITTEL ETAL 3,096,844
STEERING AND FOLLOW-UP LINKAGE ASSEMBLY
Filed April 20, 1961 6 Sheets-Sheet 2

INVENTOR.
Richard L. Sittel
Jerry A. Shelton
BY
ATTORNEY

July 9, 1963

R. L. SITTEL ETAL 3,096,844

STEERING AND FOLLOW-UP LINKAGE ASSEMBLY

Filed April 20, 1961

INVENTOR.
Richard L. Sittel
Jerry A. Shelton

BY

ATTORNEY

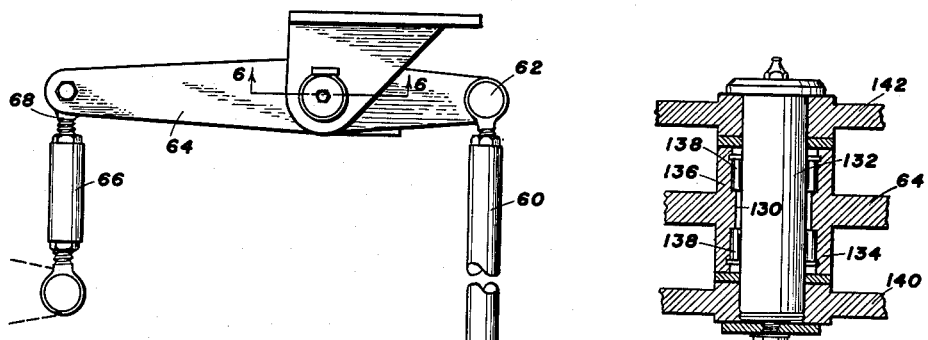
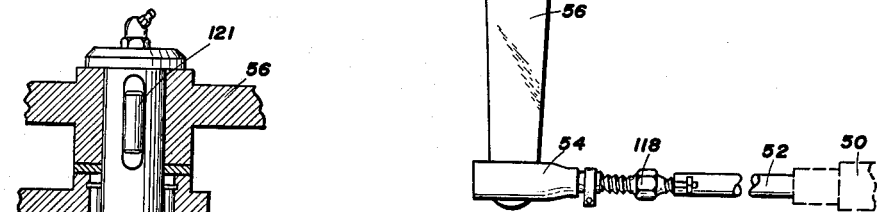
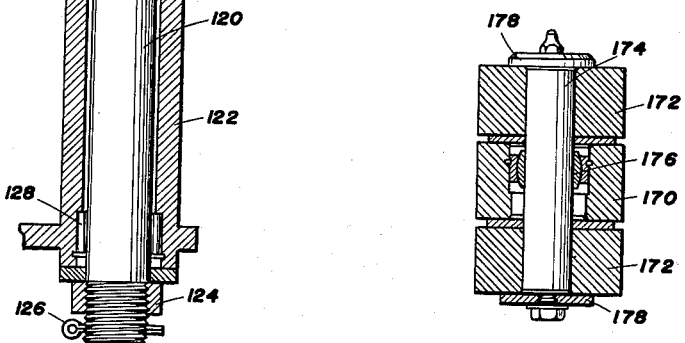
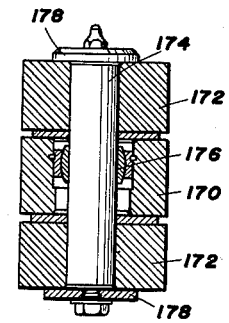

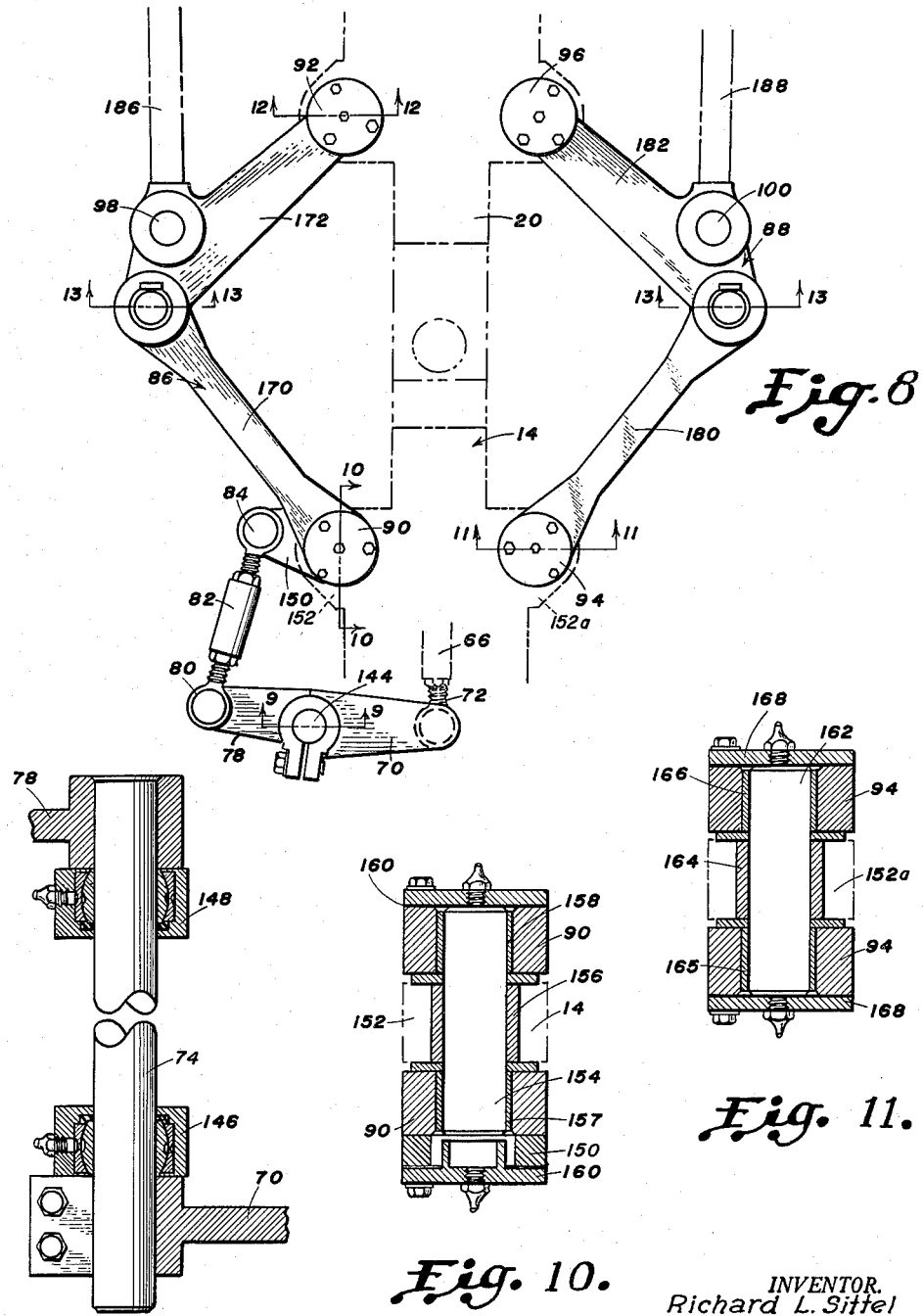

United States Patent Office 3,096,844
Patented July 9, 1963

3,096,844
STEERING AND FOLLOW-UP LINKAGE
ASSEMBLY
Richard L. Sittel and Jerry A. Shelton, Tulsa, Okla., assignors to Unit Rig & Equipment Company, Tulsa, Okla., a corporation of Delaware
Filed Apr. 20, 1961, Ser. No. 104,434
11 Claims. (Cl. 180—79.2)

This invention relates to improvements in vehicles and more particularly, but not by way of limitation, to an improved steering mechanism and follow-up linkage for a vehicle of the off-highway tractor and trailer type.

Off-highway vehicular equipment is utilized in many industries wherein large and heavy load conditions exist, such as in open pit mining and large scale construction operations and the like. The handling of large quantities of material, such as raw ore, or the like, requires equipment sufficiently heavy or strong to lift and transport the bulky material with substantial ease, and large enough to carry great quantities thereof in order to reduce the haulage time and costs. As the equipment becomes of a larger and heavier design, the ease and efficiency of operation thereof decreases accordingly, and the entire design of the equipment creates additional problems. For example, the steering mechanism must usually be specially designed for operating equipment of such large proportions. In addition, the braking system of such heavy rolling equipment presents a problem in that the weight of the loaded vehicle requires much greater braking power or force for stopping thereof. It will be readily apparent that many problems must be overcome in the design and construction of this type of oversized equipment.

There are many disadvantages of the presently available vehicles of this type. Normally, the operation of extremely large off-the-road vehicles is different from, and more complicated than the operation of trucking equipment constructed on a smaller scale. As a result, not only is the flexibility and ease of manipulation of the large equipment greatly reduced, but it is usually necessary to provide special training for the drivers or operators of the equipment. Furthermore, much of the heavy or large off-highway vehicular equipment is utilized in rough terrain wherein the difficulty of control and steering thereof is greatly increased. One particular disadvantage is an inherent tendency for the vehicle to tend to steer itself when the wheels are turned by a bump or the uneven terrain. It is difficult to overcome the self-steering tendency and correct the path of travel for the vehicle, and the situation may become hazardous to both the operator and the vehicle.

The present invention contemplates a novel off-highway vehicle of the dump truck type disclosed in a co-pending application entitled "Off-Highway Vehicle," and is particularly designed and constructed for maneuverability and ease of operation. The vehicle is provided with an efficient electric drive system which frees the driver or operator from shifting, clutching and tachometer watching. The handling or steering of the truck is substantially the same as that encountered in the driving of the more conventional sized or smaller trucks or automobiles, thus eliminating the necessity of special training for the operator thereof. In addition, a follow-up linkage mechanism is provided in combination with the steering mechanism to control or substantially eliminate the self-steering tendencies of the vehicle, and to automatically return or steer the wheels to the original position, thus greatly facilitating the steering operation. In addition, the follow-up linkage assembly is particularly designed to absorb any oscillation of the tractor with respect to the trailer which is an important advantage of the structure. The overall design and construction of the vehicle provides for a maneuverability not heretofore possible with rolling equipment of such an excessively large size. The carrying loads of the novel dump truck are considerably greater than that provided with the presently available off-highway equipment of this type, thus reducing the time and expense of haulage. And yet, even with the increased bulk of the equipment, the ease of handling and maneuverability thereof is greatly increased. It will be readily apparent that the steering mechanism in combination with the follow-up linkage is not limited to utilization with a dump truck, but may be equally efficient on substantially any tractor and trailer type vehicle.

Each wheel on the novel vehicle is independently powered, thus eliminating the need for rigid alignment therebetween. The wheels are motorized thereby eliminating the need of drive axles, transmissions, torque converters and propeller shafts for greatly reducing the drive system maintenance. The motorized wheel drive permits a greater percentage of the engine's power to be transmitted to the tires, which is particularly important in adverse terrain and weather conditions. The independent arrangement of the wheels provides a greater flexibility of operation in the normally rough terrain wherein the off-highway vehicles are frequently utilized. The tractor is connected to the trailer by a king pin hitch whereby independent oscillation of the tractor with respect to the trailer is provided for maximum maneuverability of the oversized vehicle.

It is an important object of this invention to provide a novel steering assembly for an off-highway vehicle particularly designed and constructed for ease of handling and maneuverability thereof.

It is another object of this invention to provide a novel steering and follow-up linkage assembly for an off-highway vehicle of the tractor and trailer type wherein the tractor section is free for oscillation independently of the trailer section and the oscillation is absorbed in the follow-up linkage for facilitating the handling of the vehicle.

Another object of this invention is to provide a novel off-highway vehicle of a substantially large size having a steering mechanism whereby the driving and steering of the vehicle is greatly simplified.

Still another object of this invention is to provide a novel steering mechanism for an off-highway vehicle wherein the self-steering tendencies of the vehicle are substantially eliminated.

It is still another object of this invention to provide a novel steering mechanism for an off-highway vehicle wherein the steering thereof is substantially similar to the steering of the usual truck or automobile, thereby eliminating the necessity of special driver training for the operator thereof.

It is a further object of this invention to provide an off-highway vehicle wherein the wheels thereof are independently powered to eliminate rigid alignment therebetween for increasing the flexibility of operation thereof.

It is a still further object of this invention to provide a steering mechanism for an off-highway vehicle of the tractor and trailer type which is simple and efficient in operation and economical and durable in construction.

Other objects and advantages of the invention will be evident from the following detailed description, read in conjunction with the accompanying drawings, which illustrate our invention.

In the drawings:

FIGURE 5 is a plan view of a portion of the follow-up linkage mechanism.

FIGURE 6 is a sectional view taken on line 6—6 of FIG. 5.

FIGURE 7 is a sectional view taken on line 7—7 of FIG. 5.

FIGURE 8 is a plan view of an additional portion of the follow-up and steering linkage mechanism.

FIGURE 9 is a sectional view taken on line 9—9 of FIG. 8.

FIGURE 10 is a sectional view taken on line 10—10 of FIG. 8.

FIGURE 11 is a sectional view taken on line 11—11 of FIG. 8.

FIGURE 13 is a sectional view taken on line 13—13 of FIG. 8.

Figure 1:
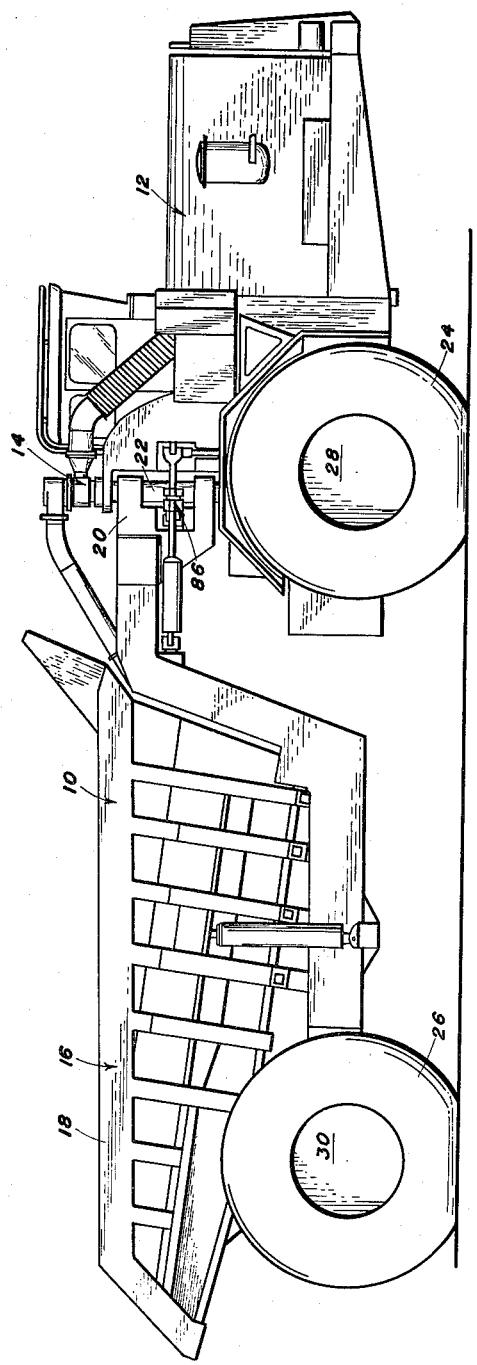
FIGURE 1 is a side elevational view of an off-highway vehicle embodying the invention.

Referring to the drawings in detail, reference character 10 generally indicates an off-highway vehicle, preferably of the tractor and trailer type, but not limited thereto. The truck 10 comprises three basic components, namely, a front tractor or cab section 12, a central or king post mid-section 14, and a rear trailer section 16. The vehicle 10 depicted herein is of the dump truck type as shown in the aforementioned co-pending application entitled "Off-Highway Vehicle," but it is to be understood that the invention is not limited to utilization with a dump truck vehicle.

The king post hinge section 14 interconnects the tractor section 12 and trailer section 16 in such a manner that the tractor 12 may oscillate independently with respect to the trailer 16. The king post section 14 may be secured to the trailer section 16 by means of a suitable yoke member 20 which is preferably journalled to the king post member 22 whereby the trailer section 16 may rotate in a substantially horizontal plane therearound, as is well known. The king post hinge section 14 is preferably journalled to the tractor section 12 in any suitable manner (not shown) whereby the tractor section 12 may rock in a lateral direction, or oscillate about the longitudinal axis thereof independently of the trailer section. This greatly facilitates the handling or driving of the vehicle 10, particularly when traversing rough terrain.

The vehicle 10 is preferably of the four wheel type wherein a pair of front wheels 24 are provided on the tractor section 12 and a pair of rear wheels 26 (only one of which is shown) are provided on the trailer section 16. Each of the front wheels 24 is provided with a separate or independent motor 28 mounted in the rim thereof to provide the driving power therefor. Similarly, each of the rear wheels 26 is provided with an independent motor 30 mounted entirely within the rim thereof. The motors 28 and 30 are supplied with electric power from a suitable generator (not shown) provided in the tractor section 12 and driven by the truck or vehicle engine (not shown), as is well known. The wheels 24 are preferably bolted (not shown) directly to the side or frame of the tractor section 12, and the wheels 26 may be similarly secured directly to the frame of the trailer section 16. In this manner, the wheels 24 and 26 are independently secured to the tractor 12 and trailer 16, and there is no need for axles, transmission, drive shafts, or the like, therefor. This motorized wheel arrangement permits an all-wheel drive for the vehicle 10.

Figure 2:
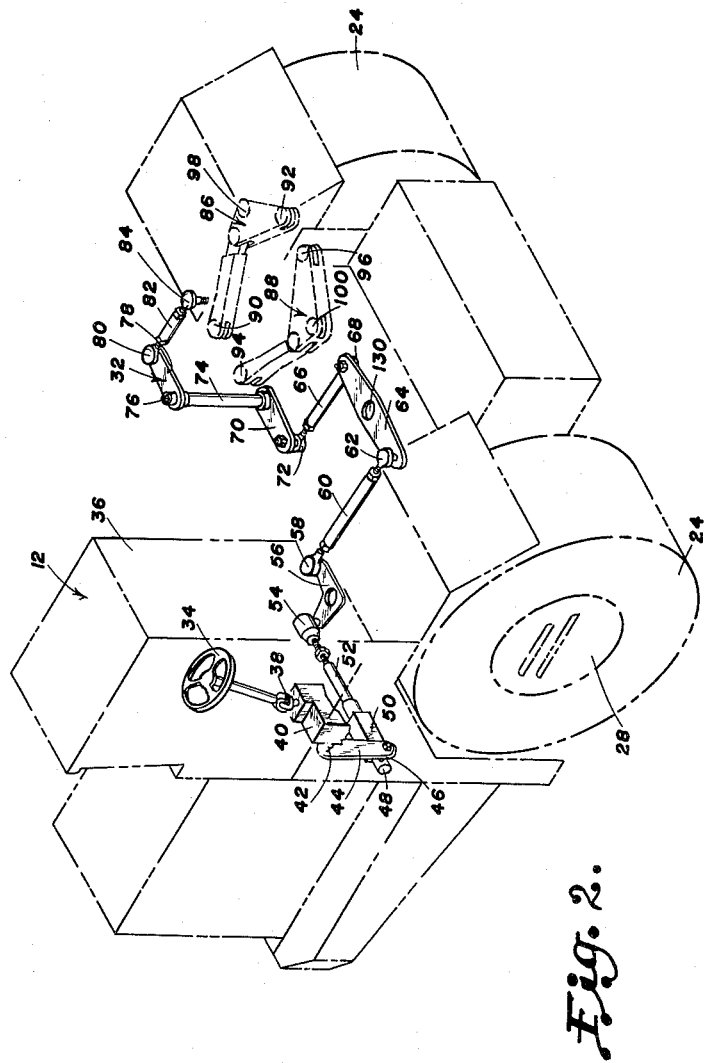
FIGURE 2 is a perspective view of a steering and follow-up linkage system embodying the invention with portions of the vehicle depicted in dotted lines for purposes of illustration.

Referring to FIG. 2, the follow-up linkage assembly, generally indicated at 32, is depicted in solid lines with portions of the vehicle 10 in dotted lines for clarity. A steering wheel 34 is provided in the cab 36 of the tractor section 12, and is preferably of any well known or standard type. The steering wheel 34 is suitably connected at 38 with a housing 40 (broken away in FIG. 2 for purposes of illustration) containing a suitable gearing arrangement, such as worm gears, and the like (not shown) for rotating a shaft 42 upon manual rotation of the steering wheel. A link arm 44 is carried at one end by the shaft 42 and is provided with an oppositely disposed outwardly extending shaft 46 at the opposite end thereof rigidly secured to a spool member 48. Rotation of the shaft 42 in one direction pivots the link arm 44 thereabout whereby the spool member 48 is moved in a left hand direction, as viewed in FIG. 2, and rotation of the shaft 42 in an opposite direction pivots the arm 44 thereabout whereby the spool member 48 is moved in a right hand direction, for a purpose as will be hereinafter set forth.

The spool member 48 is slidably disposed in the housing 50 of any suitable well known steering valve, and reciprocates within the housing 50 upon the pivoting of the arm 44. The reciprocation of the spooling 48 within the housing 50 alters the flow of the fluid normally contained therein for operation of the valve in substantially the usual manner, as will be hereinafter set forth.

The housing 50 is provided with an axially extending rod member 52 whereby the housing 50 may be moved longitudinally with respect to the spool 48, as is well known. The rod member 52 is suitably pivotally secured at 54 to a bell crank member 56 which in turn is suitably pivotally secured at 58 to a rod 60. The rod 60 is pivotally secured at 62 to one end of a lever arm 64 which is pivotally secured at the opposite end to a rod 66. The rod 66 is secured to the lever arm 64 by a suitable bearing member 68 whereby the oscillation of the tractor 12 will be absorbed by the rod 66 and not transmitted to the arm 64 and link members interconnected thereto, as hereinbefore set forth. It is of importance that the rod 66, and particularly the ball joint connection 68, be positioned substantially exactly on the axis of oscillation of the tractor section 12. The steering wheel 34 and gear box 40, along with the steering valve 50 and link members interconnecting the lever arm 64 therewith are suitably supported on the frame work of the tractor section 12 in a manner as will be hereinafter set forth.

The opposite end of the rod 66 is secured to a link arm 70 by a suitable bearing member 72 which is preferably similar to the bearing 68 and is also disposed on the axis of oscillation of the tractor 12. In this manner, the oscillation of the tractor section 12 will be absorbed by the rod 66 and will not be transmitted to the link arm 70. This positioning of the rod 66 substantially exactly on the axis of oscillation of the tractor is of extreme importance, and is the particular feature which provides the improved and efficient operation of the follow-up linkage system 32.

The arm 70 carries an upstanding rod member 74 at the opposite end thereof, and the rod 74 is rigidly secured at 76 to a link arm 78. The link arm 78 is pivotally secured at 80 to a rod member 82 which in turn is secured at 84 to a steering link 150 (FIG. 8) which is secured to the king post hinge section 14. The arm 70, rod 74, link member 78 and rod 82 are thus carried by the king post hinge section 14. The king post hinge section 14 may be secured to the trailer section 16 by a pair of oppositely disposed pivotal link members 86 and 88, as is well known. The pivotal link mechanism 86 is pivotally secured at 90 to the king post hinge section 14, and is pivotally secured at 92 to the trailer section 16. The pivotal link mechanism 88 is similarly secured at 94 to the king post hinge section 14, and at 96 to the trailer section 16. The cooperating link members 86 and 88 alternately expand and contract upon relative angular movement between the trailer section 16 and the tractor section 12, as is well known, during the operation of the vehicle 10.

The steering valve 50 may be of any well known suitable type, and is preferably a closed cycle, four position spool valve, but not limited thereto. The valve 50 is suitably interconnected with a fluid cylinder (not shown) by means of flexible conduits, or the like (not shown) whereby operation of the valve 50 shunts the flow of the fluid for operation of the follow-up linkage system 32, as will be hereinafter set forth in detail. The fluid cylinder is carried by the trailer section 16 and is provided with suitable conduits (not shown) for directing the operating fluid alternately to a pair of piston members 186 and 188. The piston 186 is suitably connected to a pin 98 on the link member 86 and the piston 188 is suitably connected to a pin 100 on the link member 88 for a purpose as will be hereinafter set forth. The application of fluid to the piston 186 results in a simultaneous withdrawal of fluid from the piston 188, and conversely, the application of fluid to the piston 188 results in a simultaneous withdrawal of the fluid from the piston 186. In this manner, the linkage mechanisms 86 and 88 are alternately contracted and expanded for changing the angular position of the tractor section 12 with respect to the trailer section 16, as is well known, and as will be hereinafter set forth.

Referring now to FIGS. 3 through 13, the steering wheel 34 is preferably of any well known type and is provided with the usual steering column 102 which may be suitably secured in the cab section 12 by the bracket member 104. The steering column 102 extends downwardly into connection at 38, as hereinbefore set forth, with the gear box 40. The gear box 40 may be rigidly secured to the frame of the tractor section 12 by an angled bracket member 106 and cooperating bolts 108, or the like. The gearing mechanism (not shown) within the gear box 40 is actuated by the manual rotation of the steering wheel 34, as is well known. Rotation of the wheel 34 in one direction actuates the gear mechanism in such a manner that the shaft 42 is rotated in a clockwise direction and rotation of the wheel 34 in an opposite direction actuates the gear mechanism in such a manner that the shaft 42 is rotated in a counterclockwise direction. As hereinbefore set forth, the rotation of the shaft 42 is transmitted to the arm member 44 for an oscillation thereof in accordance with the direction of steering. A pair of opposed outwardly extending flange members 110 and 112 are provided on one face of the bracket member 106 and spaced from the arm member 44 as clearly shown in FIG. 4. An adjustable stop member 114 and 116 is provided in the flanges 110 and 112, respectively, and functions for limiting the rotational movement of the arm 44.

The spool member 48 is reciprocated with respect to the valve housing 50 upon oscillation of the arm 44. The valve 50 carries the rod 52, which is either integral therewith or otherwise rigidly secured thereto, whereby the housing 50 tends to remain stationary when the spool member 48 is reciprocated therein, thus resulting in relative movement therebetween for shunting the flow of the fluid passing through the valve. The steering valve 50 is normally extremely sensitive, and only a very slight movement or variance in disposition between the spool member 48 and the housing 50 results in a disturbance of the balance of the fluid for instigating the actuation of the steering and follow-up linkage mechanism 32.

The arm 52 is adjustably secured to the ball and stud joint member 54 by a threaded stud 118, or the like, whereby the distance between the arm 52 and the bell crank 56 may be adjusted as desired. The bell crank 56 is supported by an upstanding shank member 120 (FIG. 7) which may be keyed thereto at 121. The shank member 120 is loosely disposed within a support sleeve 122 which in turn is suitably secured to the front cab section 12 in any well known manner (not shown). The shank 120 extends through the sleeve 122 and may be retained therein by a nut 124 and a cooperating cotter pin 126, or the like, and is rotatably supported therein by a plurality of spaced bearing members 128. In this manner, the arm 52 is supported on the cab section 12, but is free to rotate with the shank 120 during the actuation of the follow-up linkage mechanism 32.

As hereinbefore set forth, the arm 60 is journalled or pivotally secured at one end at 58 to the bell crank 56 and at the opposite end at 62 to the lever arm 64. The lever arm 64 is provided with a substantially centrally disposed aperture 130 (FIG. 2) for receiving an upstanding shaft 132 (FIG. 6). The shaft 132 is loosely disposed in the bore 130 and extends through a pair of oppositely disposed cylindrical bosses 134 and 136 provided on the arm 64. The shaft 132 is journalled within the sleeves or bosses 134 and 136 by a plurality of bearing members 138 and is retained therein by a pair of spaced support members 140 and 142 which may be secured to the front cab section 12 in any suitable manner (not shown). The lever 64 is secured to the front cab section 12 and pivots freely about the shaft 132.

The rod 66 is disposed substantially exactly on the axis of oscillation of the tractor section 12, as hereinbefore set forth, and is secured to the opposite end of the lever 64 by the bearing member 68 whereby the rod 66 may rotate about its longitudinal axis without effecting the lever 64. The rod 66 is similarly secured to the arm 70 by the bearing 72 whereby rotation of the rod 66 about the longitudinal axis thereof will not be transmitted to the arm 70. The arm 70 carries an upstanding shaft 74 (FIG. 9) supported thereon by a self-aligning bushing member 146. The shaft 74 extends upwardly for receiving the arm 78 thereon. The arm 78 is supported on a second self-aligning bearing 148 disposed around the shaft 74, as is well known, thus securing the arm 78 to the arm 70 for transmitting rotation therebetween. The rod 82 is pivotally secured at 80 to the arm 78 and the opposite end is secured at 84 to the steering link 150 (FIG. 8) which in turn is secured to the king post hinge section 14 (indicated in dotted lines in FIG. 8) in any suitable manner.

The linkage mechanism 86 may be of any well known type, and is preferably secured at one end 90 to the king post hinge section 14 in any suitable manner such as depicted in FIG. 10. The end 90 is preferably bifurcated for receiving a member 152 of the king post hinge section 14 therein. The steering link 150 is disposed below the end 90 and an upstanding stud 154 extends through the bifurcated end 90, the link 150, and member 152 and is journalled therein by a suitable bushing 156 and bearings 157 and 158. The shaft or stud 154 may be retained in position by suitably spaced cover members 160. The linkage mechanism 88 is substantially identical to the mechanism 86, and is preferably bifurcated at the end 94 to receive the king post hinge member 152a therein, as shown in FIG. 11. A stud 162 extends through the bifurcated end 94 and member 152 and is journalled therein by means of a suitable bushing 164 and bearings 165 and 166. The stud 162 is retained in position by a pair of spaced cover members 168. In this manner, both the linkage mechanisms 86 and 88 are pivotally secured to the king post hinge section 14.

The linkage mechanism 86 may comprise a pair of link arm members 170 and 172 which are pivotally secured together as shown in FIG. 13. The arm 172 is bifurcated for receiving the arm 170 therebetween, and a shaft member 174 having a self-aligning bearing member 176 therearound extends therebetween. The arm 170 is bifurcated at the opposite end 90 thereof, as hereinbefore set forth for connection with the member 152 of the king post hinge section 14. The stud 174 is retained in position by suitable retaining members 178. In this manner, the arms 170 and 172 may pivot with respect to each other. The linkage mechanism 88 is similarly provided with a pair of link arms 180 and 182 which are pivotally secured in the same manner as set forth with the arms 170 and 172. The arm 180 is bifurcated at 94 for connection with the member 152a of the king post hinge section 14 as hereinbefore set forth.

Figures 3, 4, 12:
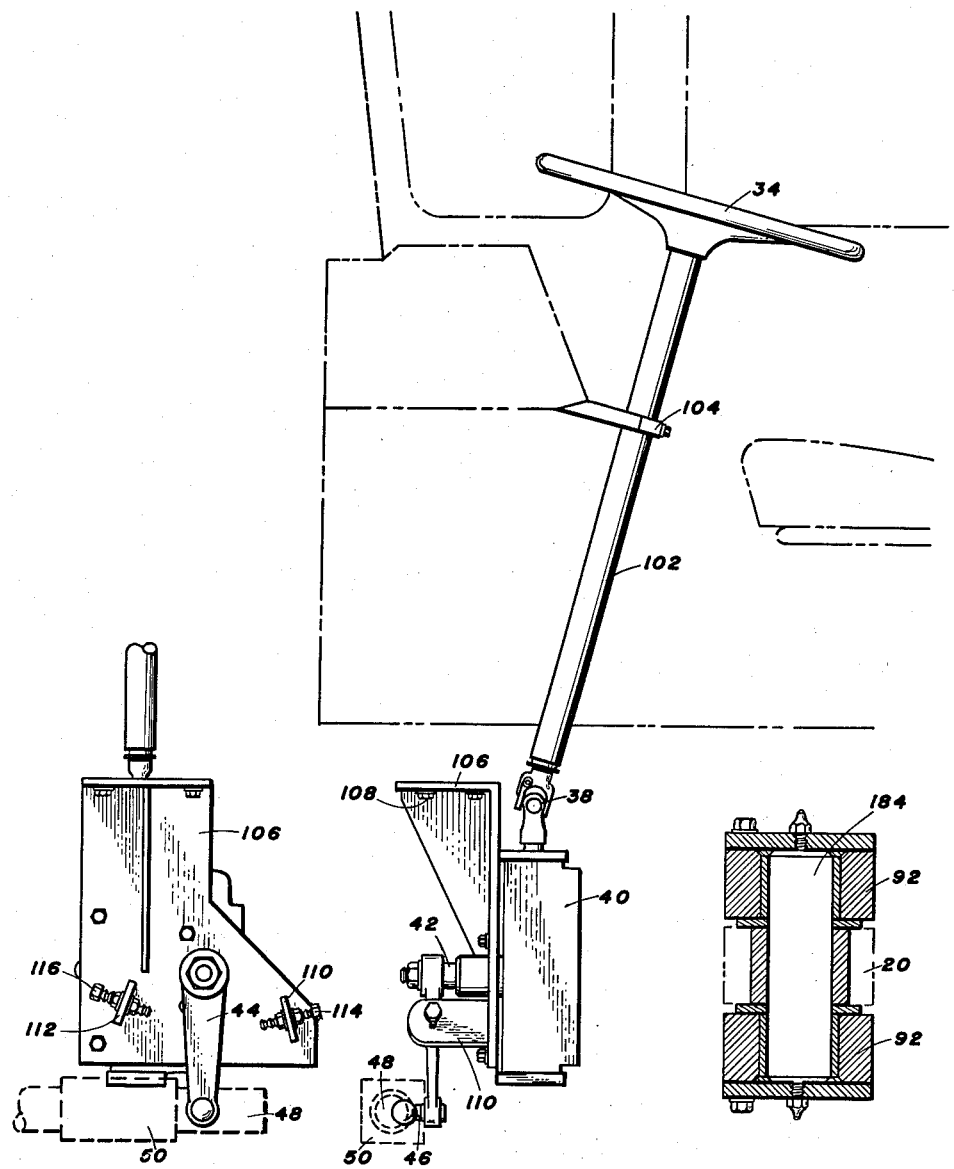
FIGURE 3 is a side elevational view of the steering control mechanism with portions of the truck body depicted in dotted lines for clarity.
FIGURE 4 is a sectional view of a portion of the steering control mechanism taken at right angles to FIG. 3.
FIGURE 12 is a sectional view taken on line 12—12 of FIG. 8.
Figure 14:
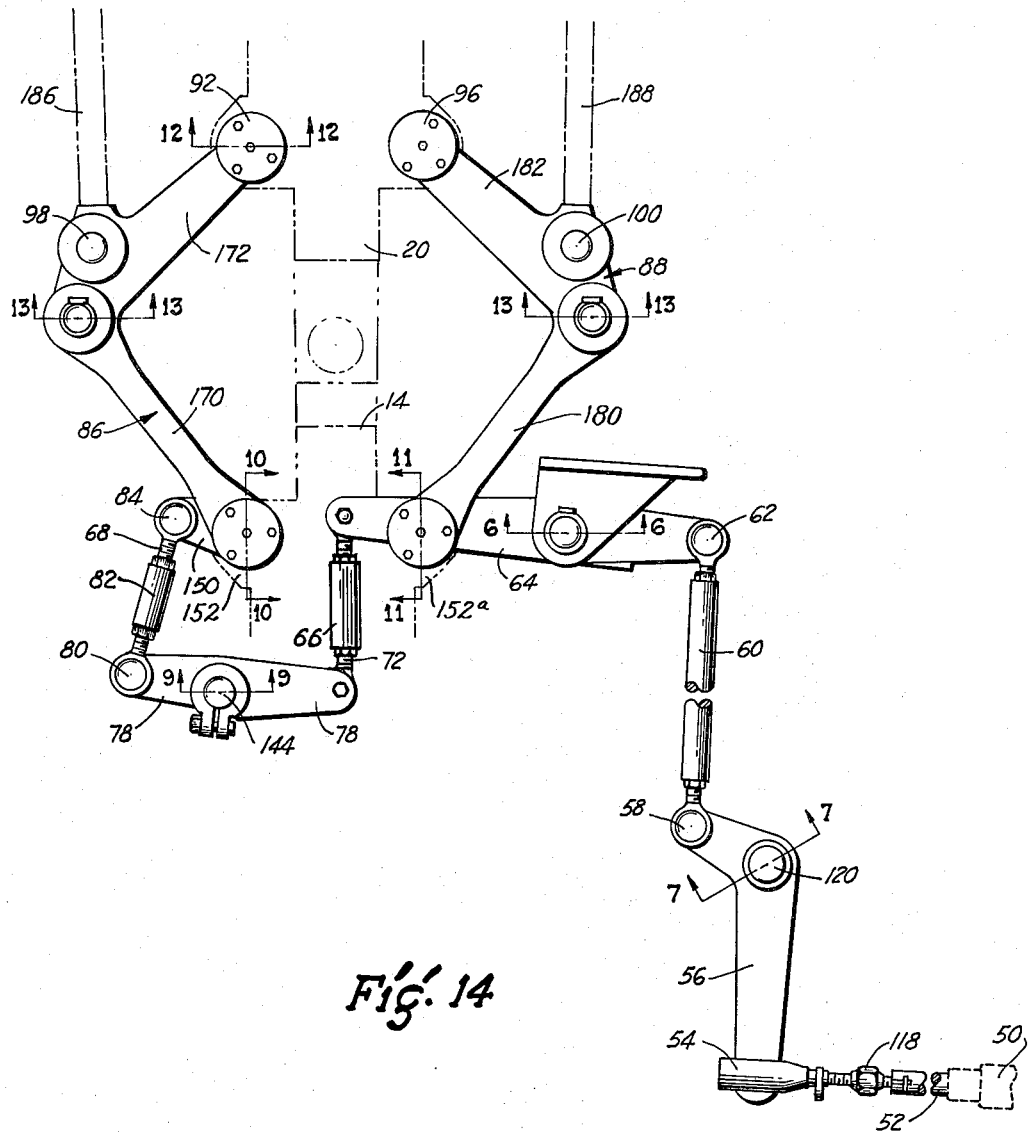
FIGURE 14 is a plan view of the follow-up linkage mechanisms, combining the portions thereof depicted in FIGURES 5 and 8.

The end 92 of the linkage mechanism 86 is preferably secured to the yoke member 20 of the trailer section 16, and as shown in FIG. 12. The end 92 is bifurcated for receiving the yoke member 20 therebetween, and a shaft 184 extends therethrough for journalling the arm 172 to the yoke 20. The end 96 of the linkage mechanism 88 is similarly secured to the yoke member 20, and in this manner, both the linkage mechanisms 86 and 88 are pivotally secured to the trailer section 16.

As particularly shown in FIG. 8, the pin 98 of the linkage mechanism 86 is connected with the piston 186 of the fluid cylinder (not shown) whereby the application of fluid to the piston 186 will move the pin 98 in a direction to tend to straighten the linkage mechanism 86. Conversely, the withdrawal of fluid from the piston 186 will move the pin 98 in a direction to tend to fold or bend the linkage mechanism, as is well known. Similarly, the pin 100 of the linkage mechanism 88 is connected with the piston 188 of the fluid cylinder (not shown) whereby the application of fluid to the piston 188 will tend to straighten the linkage mechanism 88. Conversely, the withdrawal of fluid from the piston 188 will tend to fold or bend the linkage mechanism 88, as is well known.

Operation

The steering of the vehicle 10 is substantially the same as that utilized in the driving or steering of the usual smaller type vehicle. The steering wheel 34 is manually rotated in the well known manner for maneuvering of the vehicle 10. As the wheel 34 is turned or rotated in one direction, the arm 44 is oscillated in a direction for moving the spool 48 in a left hand direction with respect to the housing 50, as viewed in FIG. 2. This movement of the spool 48 diverts the flow of fluid through the valve 50, as is well known, whereby the fluid will be delivered to the piston 188 and simultaneously withdrawn from the piston 186. This fluid movement causes the linkage mechanism to actuate whereby the mechanism 88 tends to expand and the mechanism 86 tends to contract whereby the tractor section 12 tends to turn to the right with respect to the trailer section 16, as is well known. The right turning of the tractor 12 causes the connection 84 to move forwardly for pushing the rod 82 forward whereby the follow-up linkage assembly 32 is actuated for pulling or moving the rod 52 in a left hand direction. The rod 52 is rigidly secured or integral with the valve housing 50, and thus, the housing 50 moves to the left for restoring the normal position thereof with respect to the spool 48. The continued rotation of the wheel 34 in the said direction will continue the turning operation, and the follow-up linkage assembly 32 will tend to constantly correct itself whereby the steering is greatly facilitated.

Of course, the rotation of the wheel 34 in an opposite direction will oscillate the arm 44 in a reverse direction whereby the fluid will be delivered to the piston 186 and withdrawn from the piston 188. In this instance, the tractor section 12 will tend to turn to the left with respect to the trailer section 16, and the rod 82 will be pushed or urged rearwardly whereby the follow-up linkage assembly 32 will actuate the rod 52 in a right hand direction for restoring the normal position of the housing 50 with respect to the spool 48.

In the event the wheels 24 of the vehicle 10 are diverted from the desired or intended path, such as by contact with a bump or rut, or the like, in the terrain, any tendency of the tractor section 12 to turn with respect to the trailer section 16 will unbalance the fluid pressure and automatically actuate the follow-up linkage assembly 32 as hereinbefore set forth for restoring the normal steering position. The driver of the vehicle 10 need only to hold or retain the steering wheel 34 substantially without rotation, and the vehicle 10 will return to the desired driving condition.

The particular arrangement of elements of the follow-up linkage results in isolating any self-steering action due to oscillation, making the follow-up linkage assembly totally non-sensitive to any oscillation of the tractor. When the vehicle hits an extremely large bump, or the like, wherein the tractor may be oscillated, with no turning motion, particularly when the oscillation is through a large angle, such as fifteen degrees or more, the oscillation action tries to move the entire linkage system whereby the link members actuate the steering valve to steer the vehicle. However, since the bearing members 68 and 72, and rod 66, are disposed on the axis of oscillation of the tractor, the self-steering action is isolated, and is not transmitted between the two portions of the linkage mechanism. Thus, the steering valve is not actuated, and the steering of the vehicle is not disturbed by the oscillation of the tractor.

From the foregoing, it will be apparent that the present invention contemplates an off-highway vehicle, preferably of the tractor and trailer type, wherein the steering thereof is greatly facilitated. The simplicity of the steering operation precludes the necessity of specialized driver training and increases the maneuverability of the vehicle. The follow-up linkage assembly precludes or overcomes any tendency of the vehicle to self-steer for greatly increasing the ease of handling thereof, particularly when driving over rough terrain. The novel steering and follow-up linkage system is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In a vehicle comprising a tractor and a trailer, a steering assembly comprising steering means carried by the tractor, a follow-up linkage assembly interposed between the trailer and the steering means, said follow-up linkage assembly comprising a pair of linkage assemblies responsive to turning of the tractor with respect to the trailer by the steering means for restoring normal driving conditions to the vehicle, said follow-up linkage assembly provided with means interposed between the linkage assemblies and disposed on the axis of oscillation of the trailer to isolate any self-steering action due to the oscillation of the tractor.

2. In a vehicle comprising a tractor and a trailer, a steering assembly comprising steering means carried by the tractor, a follow-up linkage assembly interposed between the trailer and the steering means, said follow-up linkage assembly comprising first and second linkage means actuated by turning of the tractor with respect to the trailer for automatically restoring normal driving conditions to the steering means for substantially eliminating any self-steering of the vehicle, and pivotal means provided in the follow-up linkage and interposed between the said first and second linkage means for absorbing any oscillation of the tractor with respect to the trailer.

3. In combination with a tractor and trailer vehicle, a steering assembly comprising steering means for the tractor, follow-up linkage means interposed between the steering means and the trailer, said follow-up linkage means comprising a rod member disposed substantially on the axis of oscillation of the tractor, oppositely disposed linkage systems journalled to the rod and connecting the rod between the trailer and steering means whereby the oscillation of the tractor is absorbed by the rod, steering valve means actuated by the steering means to provide for turning of the tractor with respect to the trailer, said follow-up linkage means responsive to turning of the tractor for automatically restoring normal driving conditions to the vehicle.

4. In combination with a tractor secured to a trailer by a king post section, a steering assembly comprising steering means carried by the tractor, follow-up linkage means connected with the steering means and comprising a rod disposed substantially on the axis of oscillation of the tractor, a linkage assembly journalled to one end of the rod and secured to the king post section, a second linkage assembly journalled to the opposite end of the rod and secured to the tractor, steering valve means interposed between the follow-up linkage means and the steering means to provide for turning of the tractor with respect to the trailer, and said follow-up linkage means responsive to turning of the tractor for automatically restoring normal steering conditions to the vehicle.

5. In combination with a tractor secured to a trailer by a king post section, a steering assembly comprising steering means carried by the tractor, a follow-up linkage mechanism connected with the steering means and interposed between the tractor and king post hinge section, said follow-up linkage mechanism provided with rod means providing a pivotal connection in the linkage mechanism disposed on the axis of oscillation of the trailer for absorbing any oscillation of the tractor with respect to the trailer, steering valve means actuated by the steering means to provide for turning of the tractor, and said follow-up linkage mechanism having first and second linkage assemblies pivotally secured to the rod means and responsive to turning of the tractor for automatically restoring normal steering conditions to the vehicle.

6. In combination with a tractor secured to a trailer by a king post section, a steering assembly comprising a steering wheel carried by the tractor, steering valve means actuated by the steering wheel for providing turning of the tractor with respect to the trailer, a follow-up linkage mechanism carried by the tractor and king post section and connected with the steering valve means oppositely disposed from the steering wheel, said follow-up linkage mechanism having a pair of linkage assemblies responsive to turning of the tractor for automatically restoring normal steering conditions to the steering valve, and pivotal means provided in the follow-up linkage mechanism and interposed between the pair of linkage assemblies for absorbing any oscillation of the tractor.

7. In combination with a tractor secured to a trailer by a king post section, a steering assembly comprising steering means carried by the tractor, follower-up linkage means connected to the steering means for actuation thereby, said follow-up means comprising a rod member disposed substantially on the axis of oscillation of the tractor for absorbing any oscillation thereof with respect to the trailer, a plurality of link members journalled to one end of the rod member and carried by the king post section, a plurality of link members journalled to the opposite end of the rod and carried by the tractor, said last mentioned link members secured to the steering means, and said follow-up linkage means responsive to turning of the tractor for automatically restoring normal driving conditions to the steering means.

8. In combination with a tractor secured to a trailer by a king post section, a steering assembly comprising a steering wheel carried by the tractor, steering valve means actuated by the steering wheel for providing turning of the tractor with respect to the trailer, follow-up linkage means connected to the steering valve means opposite from the steering wheel and comprising a rod member disposed substantially on the axis of oscillation of the tractor for absorbing any oscillation thereof with respect to the trailer, a plurality of link members journalled to one end of the rod member and carried by the king post section, a plurality of link members journalled to the opposite end of the rod and carried by the tractor, said last mentioned link members secured to the steering valve means, and said follow-up linkage means responsive to turning of the tractor for automatically restoring normal driving conditions to the steering means.

9. A steering assembly for a vehicle and comprising steering means, a follow-up linkage assembly connected with the steering means and comprising first and second linkage means responsive to turning of the vehicle for automatically substantially eliminating self-steering of the vehicle and pivotal means provided in the follow-up linkage assembly and interposed between the said first and second linkage means for absorbing any oscillation of the vehicle, said means disposed on the axis of oscillation of the vehicle.

10. In a vehicle comprising a tractor and a trailer, a steering assembly comprising steering means carried by the tractor, a follow-up linkage assembly interposed between the trailer and the steering means, said follow-up linkage assembly having first and second linkage means responsive to turning of the tractor with respect to the trailer by the steering means for restoring normal driving conditions to the vehicle, said first and second linkage means responsive to accidental turning of the tractor independently from the steering means for automatically restoring normal driving conditions and substantially eliminating self-steering of the vehicle, means provided in the follow-up linkage assembly and interposed between the said first and second linkage means for absorbing any oscillation of the tractor with respect to the trailer, and said means disposed on the axis of oscillation of the tractor.

11. In a vehicle comprising a tractor and a trailer, a steering assembly comprising steering means carried by the tractor, a follow-up linkage assembly interposed between the trailer and the steering means, said follow-up linkage assembly having first and second linkage means actuated by turning of the tractor with respect to the trailer for automatically restoring normal driving conditions to the steering means for substantially eliminating any self-steering of the vehicle, means provided in the follow-up linkage and interposed between said first and second linkage means for absorbing any oscillation of the tractor with respect to the trailer, and said means disposed on the axis of oscillation of the tractor.

References Cited in the file of this patent
UNITED STATES PATENTS

| | | |
|---|---|---|
| 2,403,325 | Armington | July 2, 1946 |
| 2,557,513 | Quartullo | June 19, 1951 |
| 2,614,644 | Gustafson | Oct. 21, 1952 |
| 2,863,234 | Armington | Dec. 9, 1958 |
| 2,896,734 | Toth | July 28, 1959 |